US012039945B1

(12) United States Patent
Slocum et al.

(10) Patent No.: US 12,039,945 B1
(45) Date of Patent: Jul. 16, 2024

(54) METHODS AND SYSTEMS FOR DETERMINING CHARACTERISTICS OF SENSORS USING E-INK DISPLAY DEVICES

(71) Applicant: LG INNOTEK CO., LTD., Seoul (KR)

(72) Inventors: Richard Slocum, San Francisco, CA (US); Martin Jan Tauc, San Mateo, CA (US)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/088,846

(22) Filed: Dec. 27, 2022

(51) Int. Cl.
*G09G 3/34* (2006.01)

(52) U.S. Cl.
CPC ......... *G09G 3/344* (2013.01); *G09G 2380/10* (2013.01)

(58) Field of Classification Search
CPC ........................................................ G01S 7/497
See application file for complete search history.

(56) References Cited

U.S. PATENT DOCUMENTS

| | | | |
|---|---|---|---|
| 4,621,265 A | 11/1986 | Buse et al. | |
| 2020/0226790 A1* | 7/2020 | Alvarez | G01S 13/931 |
| 2021/0003711 A1* | 1/2021 | Vandenberg, III | G01S 17/93 |
| 2021/0190926 A1 | 6/2021 | Schmalenberg et al. | |
| 2022/0018965 A1 | 1/2022 | Lobnik et al. | |

FOREIGN PATENT DOCUMENTS

WO WO-2020156952 A1 * 8/2020 ............. G01B 11/27

* cited by examiner

*Primary Examiner* — Priyank J Shah
(74) *Attorney, Agent, or Firm* — Birch, Stewart, Kolasch & Birch, LLP

(57) ABSTRACT

Systems may include at least one processor configured to receive data associated with a first display of an e-ink display device and data associated with a second display of the e-ink display device, process the data associated with the first display of the e-ink display device and the data associated with the second display of the e-ink display device to provide a quantitative result, and determine a characteristic of a sensor system based on the quantitative result. Methods, computer program products, and autonomous vehicles are also disclosed.

20 Claims, 7 Drawing Sheets

METHODS AND SYSTEMS FOR DETERMINING CHARACTERISTICS OF SENSORS USING E-INK DISPLAY DEVICES

BACKGROUND

1. Field

This disclosure relates generally to aspects of sensors for autonomous vehicles and, in some non-limiting embodiments, to determining a characteristic of a sensor based on a display of an e-ink display device.

2. Technical Considerations

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without manual input from an individual. An autonomous vehicle (AV) uses a variety of techniques to detect the environment of the AV, such as radar, laser light, Global Positioning System (GPS), odometry, and/or computer vision. In some instances, the AV uses a control system to interpret information received from one or more sensors, to identify a route for traveling, to identify an obstacle in a route, and to identify relevant traffic signs associated with a route.

A light detection and ranging (LiDAR) sensor may refer to a sensor that uses a laser for determining ranges (e.g., variable distances) by targeting an object or a surface and measuring the time for the light of the laser reflected by the surface to return to a receiver of the sensor. A Li DAR sensor may use ultraviolet, visible, and/or near infrared light to detect (e.g., in the form of an image) objects. A LiDAR sensor can map physical features with high resolution for a wide range of targets, including non-metallic objects, rocks, rain, chemical compounds, aerosols, clouds, and even single molecules. A narrow laser beam may be used to map physical features with high resolution images. The use of a LiDAR sensor may have terrestrial, airborne, and/or mobile applications. For example, the LiDAR sensor can be used to make digital 3-D representations of areas on the Earth's surface and ocean bottom of the intertidal and near coastal zones by varying the wavelength of light.

In an AV, a LiDAR sensor may be used for obstacle detection, tracking, and motion planning for improved navigation through an environment. A point cloud output from the LiDAR sensor may provide data for robotic software to determine where potential obstacles exist in the environment and where the robot is in relation to those potential obstacles.

SUMMARY

Provided are systems, methods, products, apparatuses, and/or devices for determining a characteristic of a sensor based on a display of an e-ink display device.

According to some non-limiting embodiments, provided is a system comprising a memory; and at least one processor coupled to the memory and configured to: receive data associated with a first display of an e-ink display device and data associated with a second display of the e-ink display device, wherein the data associated with the first display of the e-ink display device is based on a first reading of the e-ink display device by a sensor system and the data associated with the second display of the e-ink display device is based on a second reading of the e-ink display device by the sensor system; process the data associated with the first display of the e-ink display device and the data associated with the second display of the e-ink display device to provide a quantitative result; and determine a characteristic of the sensor system based on the quantitative result.

According to some non-limiting embodiments, provided is a computer program product comprising at least one non-transitory computer-readable medium comprising one or more instructions that, when executed by at least one processor, cause the at least one processor to: receive data associated with a first display of an e-ink display device and data associated with a second display of the e-ink display device, wherein the data associated with the first display of the e-ink display device is based on a first reading of the e-ink display device by a sensor system and the data associated with the second display of the e-ink display device is based on a second reading of the e-ink display device by the sensor system; process the data associated with the first display of the e-ink display device and the data associated with the second display of the e-ink display device to provide a quantitative result; and determine a characteristic of the sensor system based on the quantitative result.

According to some non-limiting embodiments, provided is a method, comprising: receiving, with at least one processor, data associated with a first display of an e-ink display device and data associated with a second display of the e-ink display device, wherein the data associated with the first display of the e-ink display device is based on a first reading of the e-ink display device by a sensor system and the data associated with the second display of the e-ink display device is based on a second reading of the e-ink display device by the sensor system; processing, with at least one processor, the data associated with the first display of the e-ink display device and the data associated with the second display of the e-ink display device to provide a quantitative result; and determining, with at least one processor, a characteristic of the sensor system based on the quantitative result.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
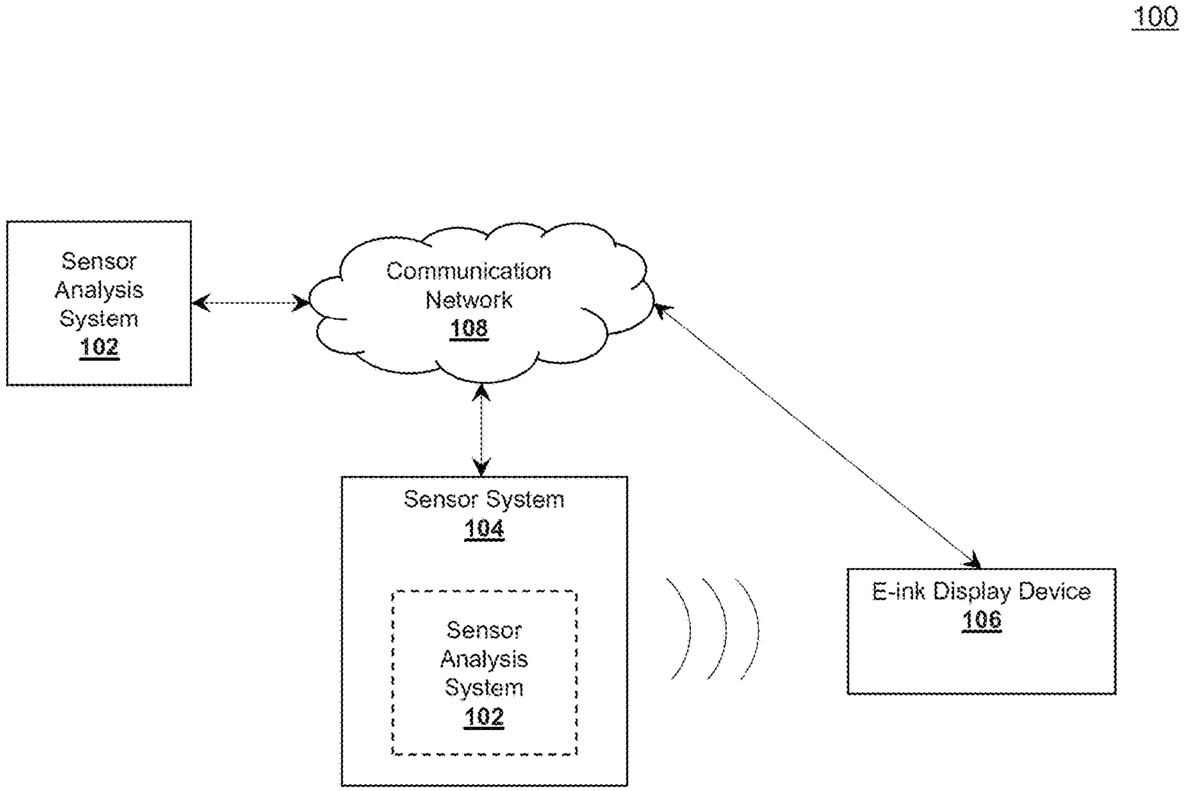
FIG. 1 is a diagram of a non-limiting embodiment of an environment in which systems, methods, and/or computer program products, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments. Hence, specific dimensions and other physical aspects related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a processor, a computing device, etc.) as appropriately referred to herein.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" is a vehicle having a processor, programming instructions, and drivetrain components that are controllable by the processor without requiring a human operator. An autonomous vehicle may be fully autonomous in that the autonomous vehicle does not require a human operator for most or all driving conditions and functions. In some non-limiting embodiments, the autonomous vehicle may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. In some non-limiting embodiments, a computing device may be a mobile device. As an example, a mobile device may include a cellular phone (e.g., a smartphone or standard cellular phone), a portable computer (e.g., a tablet), a wearable device (e.g., watches, glasses, lenses, clothing, and/or the like), a personal digital assistant (PDA), and/or other like devices. In some non-limiting embodiments, a computing device may be a computer that is not portable (e.g., is not a mobile device), such as a desktop computer (e.g., a personal computer).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, desktop computers, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a display generated by a computing device, with which a user may interact, either directly or indirectly (e.g., through a keyboard, mouse, touchscreen, etc.).

In some non-limiting embodiments, characterization of the performance of a sensor, such as a LiDAR sensor, may be performed to ensure that the sensor is functioning correctly. LiDAR characterization can be performed on targets of varying reflectivity to quantify sensor performance. In some instances, LiDAR characterization can be performed by painting targets using specific paint that represents discrete reflectivity values. These targets can be placed in the LiDAR field of view and the reflectivity of the targets can be used when quantifying sensor performance.

However, numerous targets may be required to perform a granular test of LiDAR performance. Additionally, target objects painted with different reflectivity paint in geometric patterns (e.g., a static board that includes a pattern, such as a black and white checkerboard pattern) may be required to be used to calibrate a LiDAR sensor's intrinsic parameters. Because the target object is often designed based on the spatial resolution of the sensor, each different LiDAR sensor could require a different geometric pattern. Further, due to the differences in geometric patterns, calibrating a LiDAR sensor may require multiple iterations and even then, the calibration may not be accurate. In addition, calibrating a LiDAR sensor may require the use of multiple geometric patterns and/or orientations of the LiDAR sensor which may be time consuming.

The present disclosure provides systems, methods, and computer program products that determine a characteristic of a sensor, such as a LiDAR sensor, based on a display of an e-ink display device. In some non-limiting embodiments, the present disclosure includes a sensor analysis system that includes a memory and at least one processor coupled to the memory and configured to receive data associated with a first display of an e-ink display device and data associated with a second display of the e-ink display device, process the data associated with the first display of the e-ink display and the data associated with the second display of the e-ink display device to provide a quantitative result, and determine a characteristic of a sensor system based on the quantitative result. In some non-limiting embodiments, the sensor system is a LiDAR sensor system.

In some non-limiting embodiments, when processing the data associated with the first display of the e-ink display and the data associated with the second display of the e-ink display device to provide the quantitative result, the sensor analysis system is configured to compare the data associated with the first display of the e-ink display and the data associated with the second display of the e-ink display device and determine a metric associated with a difference between the data associated with the first display of the e-ink display and the data associated with the second display of the e-ink display device. In some non-limiting embodiments, the characteristic of the sensor system is based on the metric.

In some non-limiting embodiments, the sensor analysis system is further configured to control the e-ink display device to provide the first display of an e-ink display device and control the e-ink display device to provide the second display of the e-ink display device. In some non-limiting embodiments, the first display of the e-ink display device includes a first pattern associated with a first object positioned at a first distance from the sensor system and the second display of the e-ink display device includes a second pattern associated with a second object positioned at a second distance from the sensor system. In some non-limiting embodiments, the first pattern associated with the first object positioned at the first distance from the sensor system includes a first pattern having a first value of reflectivity and the second pattern associated with the second object positioned at the second distance from the sensor system includes a second pattern having a second value of reflectivity.

In some non-limiting embodiments, the sensor analysis system is further configured to determine a calibration setting associated with a sensor of a sensor system, such as a perception component of an autonomous vehicle and/or a robotic device. In some non-limiting embodiments, the sensor analysis system is further configured to adjust the calibration setting associated with the sensor.

In this way, the sensor analysis system eliminates the need for the use of static targets and may provide a more accurate procedure for determining a characteristic of a sensor, such as a LiDAR sensor, based on a display of an e-ink display device. Furthermore, the sensor analysis system may control the e-ink display device and/or a sensor system to reduce an amount of time and/or processing resources required to determine a characteristic of a sensor. Accordingly, the sensor analysis system may provide more robust, faster, and more accurate calibration, qualification, and/or commissioning methodologies. Such a system may lead to improved sensor performance and accuracy, improved AV solutions, and further to expedited vehicle commissioning, enabling increased scalability by deploying more AVs in a shorter period of time.

Referring now to FIG. 1, FIG. 1 is a diagram of an example environment 100 in which systems, methods, products, apparatuses, and/or devices described herein, may be implemented. As shown in FIG. 1, environment 100 may include sensor analysis system 102, sensor system 104, e-ink display device 106, and communication network 108.

Sensor analysis system 102 may include one or more devices capable of communicating with sensor system 104 and/or e-ink display device 106 via communication network 108. For example, sensor analysis system 102 may include a computing device, such as a server, a group of servers, and/or other like devices. In some non-limiting embodiments, sensor analysis system 102 may communicate with sensor system 104 via an application (e.g., a mobile application) stored on sensor analysis system 102 and/or sensor system 104.

Sensor system 104 may include one or more devices capable of communicating with sensor analysis system 102 communication network 108. For example, sensor system 104 may include a computing device, such as a mobile device, a desktop computer, and/or other like devices. In some non-limiting embodiments, sensor system 104 may include one or more sensors, such as a LiDAR sensor, a light sensor, an image sensor (e.g., an image capture device, such as a camera), a laser sensor, a barcode reader, an audio sensor, and/or the like. In some non-limiting embodiments, sensor analysis system 102 may be a component of sensor system 104. In some non-limiting embodiments, sensor system 104 may include an optical remote sensing system.

E-ink display device 106 may include one or more devices capable of communicating with sensor analysis system 102 and/or sensor system 104 via communication network 108. For example, e-ink display device 106 may include a computing device, such as a server, a group of servers, and/or other like devices. Additionally or alternatively, e-ink display device 106 may include an electrophoretic display (e.g., an e-ink display). An electrophoretic display may be a display device that is configured to mimic the appearance of ordinary ink on paper by reflecting ambient light in the same way as paper.

In some non-limiting embodiments, e-ink display device 106 may include microcapsules, which may vary (e.g., digitally vary) the reflectivity of e-ink display device 106 (e.g., a screen, a panel, etc. of e-ink display device 106). In this way, e-ink display device 106 can be used to create a display, in the form of a target for a sensor, having variable reflectivity. The target may be used for characterization of the performance of a sensor, digital signal processing (DSP) tuning for development of a sensor, and/or for intrinsic calibration of a sensor. A display on a screen of e-ink display device 106 may be able to be detected by an image capture device (e.g., a camera, such as a Red, Green, Blue (RGB) camera, a LiDAR sensor, and/or other sensor modalities, and sensor analysis system 102 may use e-ink display device 106 for computing a relative orientation between multiple sensor modalities.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. In some non-limiting embodiments, an autonomous vehicle may incorporate the functionality of sensor analysis system 102 such that the autonomous vehicle can operate without communication to or from sensor analysis system 102. Additionally or alternatively, a set of devices and/or systems (e.g., one or more devices or systems) of environment 100 may perform one or more functions described as being performed by another set of devices and/or systems of environment 100.

Figure 2:
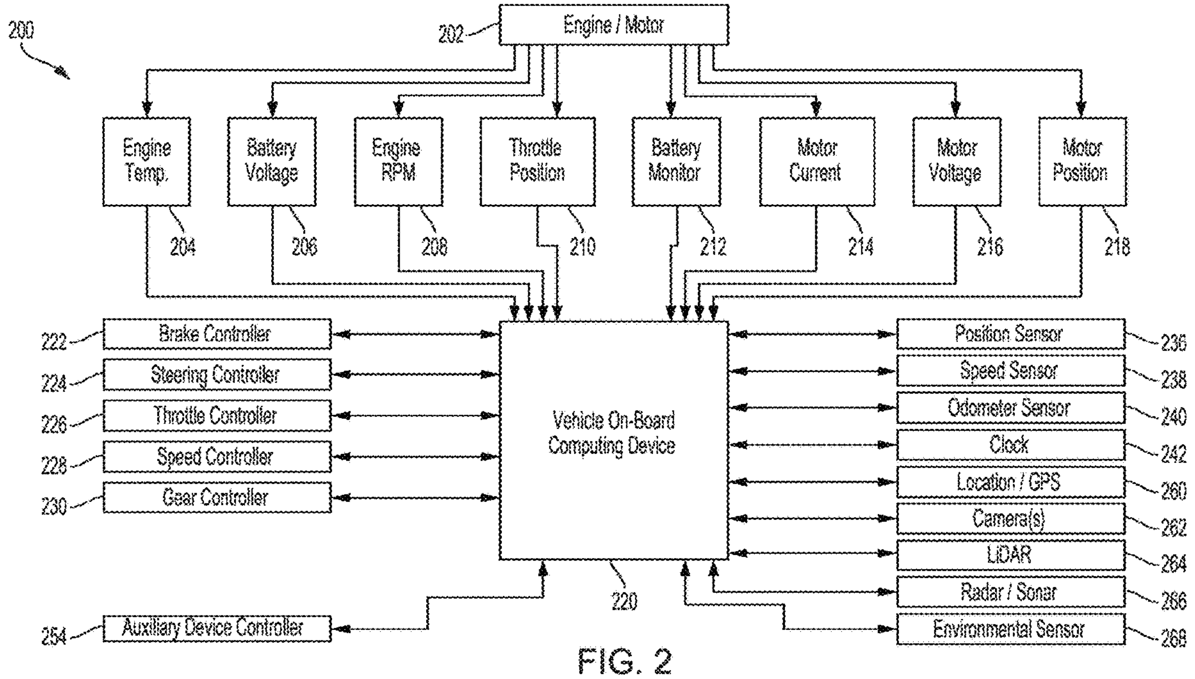
FIG. 2 is a diagram of a non-limiting embodiment of an architecture for an autonomous vehicle (AV)

Referring now to FIG. 2, FIG. 2 is an illustration of a non-limiting embodiment of system architecture 200 for a vehicle, such as an autonomous vehicle. An autonomous vehicle may include a same or similar system architecture as that of system architecture 200 shown in FIG. 2. As shown in FIG. 2, system architecture 200 may include engine or motor 202 and various sensors 204-218 for measuring various parameters (e.g., characteristics) of the vehicle. In gas-powered or hybrid vehicles having a fuel-powered engine, the sensors may include, for example, engine temperature sensor 204, battery voltage sensor 206, engine rotations per minute (RPM) sensor 208, throttle position sensor 210, and/or a seat occupancy sensor (not shown). In an electric or hybrid vehicle, the vehicle may have an electric motor and may have sensors, such as battery monitor sensor 212 (e.g., to measure current, voltage, and/or temperature of the battery), motor current sensor 214, motor voltage sensor 216, and/or motor position sensor 218, such as resolvers and encoders.

System architecture 200 may include operational parameter sensors, which may be common to both types of vehicles and may include, for example: position sensor 236, such as an accelerometer, gyroscope, and/or inertial measurement unit; speed sensor 238; and/or odometer sensor 240. System architecture 200 may include clock 242 that is used to determine vehicle time during operation. Clock 242 may be encoded into vehicle on-board computing device 220. It may be a separate device or multiple clocks may be available.

System architecture 200 may include various sensors that operate to gather information about an environment in which the vehicle is operating and/or traveling. These sensors may include, for example: location sensor 260 (e.g., a global positioning system (GPS) device); object detection sensors, such as one or more cameras 262; LiDAR sensor system 264; and/or radar and/or sonar system 266. The sensors may include environmental sensor 268, such as a precipitation sensor, an ambient temperature sensor, and/or an acoustic sensor (e.g., a microphone, a phased-array of microphones, and/or the like). In some non-limiting embodiments, any of sensors 204-218 may be the same as or similar to sensor system 104. For example, any of sensors 204-218 may operate and/or be controlled in the same or similar fashion as sensor system 104. Additionally or alternatively, sensor system 104 may include one or more of sensors 204-218.

In some non-limiting embodiments, the object detection sensors may enable system architecture 200 to detect objects that are within a given distance range of the vehicle in any direction, and environmental sensor 268 may collect data about environmental conditions within an area of operation and/or travel of the vehicle.

During operation of system architecture 200, information is communicated from the sensors of system architecture 200 to vehicle on-board computing device 220. Vehicle on-board computing device 220 analyzes the data captured by the sensors and optionally controls operations of the vehicle based on results of the analysis. For example, vehicle on-board computing device 220 may control: braking via brake controller 222; direction via steering controller 224; speed and acceleration via throttle controller 226 (e.g., in a gas-powered vehicle) or motor speed controller 228, such as a current level controller (e.g., in an electric vehicle); differential gear controller 230 (e.g., in vehicles with transmissions); and/or other controllers, such as auxiliary device controller 254.

Geographic location information may be communicated from location sensor 260 to vehicle on-board computing device 220, which may access a map of the environment, including map data that corresponds to the location information to determine known fixed features of the environment, such as streets, buildings, stop signs, and/or stop/go signals. Captured images from cameras 262 and/or object detection information captured from sensors, such as LiDAR sensor system 264, is communicated from those sensors to vehicle on-board computing device 220. The object detection information and/or captured images are processed by vehicle on-board computing device 220 to detect objects in proximity to the vehicle. Any known or to be known technique for making an object detection based on sensor data and/or captured images can be used in the embodiments disclosed in the present disclosure.

Figure 3:
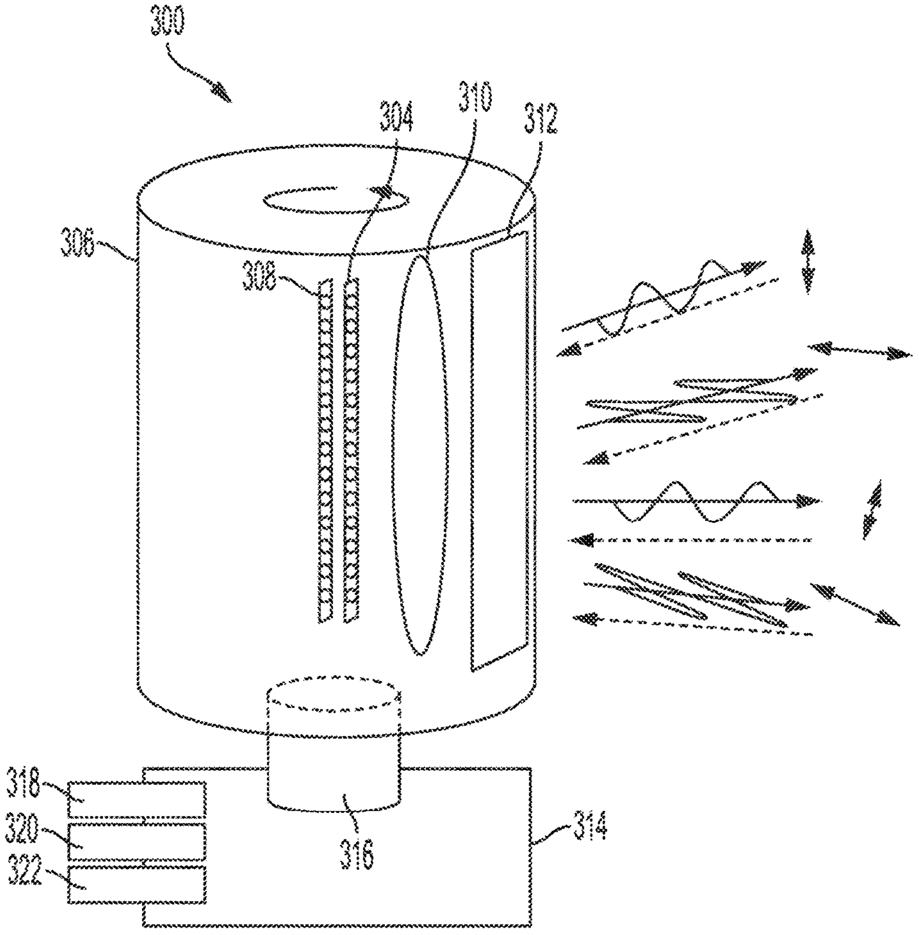
FIG. 3 is a diagram of a non-limiting embodiment of an architecture for a light detection and ranging (LiDAR) system.

Referring now to FIG. 3, FIG. 3 is an illustration of a non-limiting embodiment of LiDAR sensor system 300.

LiDAR sensor system 264 of FIG. 2 may be the same as or substantially similar to LiDAR sensor system 300. As shown in FIG. 3, LiDAR sensor system 300 may include housing 306, which may be rotatable 360° about a central axis, such as a hub or axle of motor 316. Housing 306 may include an emitter/receiver aperture 312 made of a material transparent to light (e.g., transparent to infrared light). Although a single aperture is shown in FIG. 3, non-limiting embodiments of the present disclosure are not limited in this regard. In some non-limiting embodiments, multiple apertures for emitting and/or receiving light may be provided. In this way, LiDAR sensor system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR sensor system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR sensor system 300 may include optical element structure 310 positioned in front of a mirror and connected to the rotating elements of LiDAR sensor system 300, so that optical element structure 310 rotates with the mirror. Alternatively or in addition, optical element structure 310 may include multiple such structures (e.g., lenses, waveplates, etc.). In some non-limiting embodiments, multiple optical element structures 310 may be arranged in an array on or integral with the shell portion of housing 306.

In some non-limiting embodiments, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations). In some non-limiting embodiments, each optical element structure 310 may include a polarized beam splitter that may be used to separate light, where the light is circularly polarized. In some non-limiting embodiments, the beam that is transmitted and the beam that is received may have opposite polarizations.

LiDAR sensor system 300 may include power unit 318 to power light emitter system 304, motor 316, and electronic components. LiDAR sensor system 300 may include analyzer 314 with elements, such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with LiDAR sensor system 300 as shown, or some or all of analyzer 314 may be external to LiDAR sensor system 300 and communicatively connected to LiDAR sensor system 300 via a wired and/or wireless communication network or link.

Figure 4:
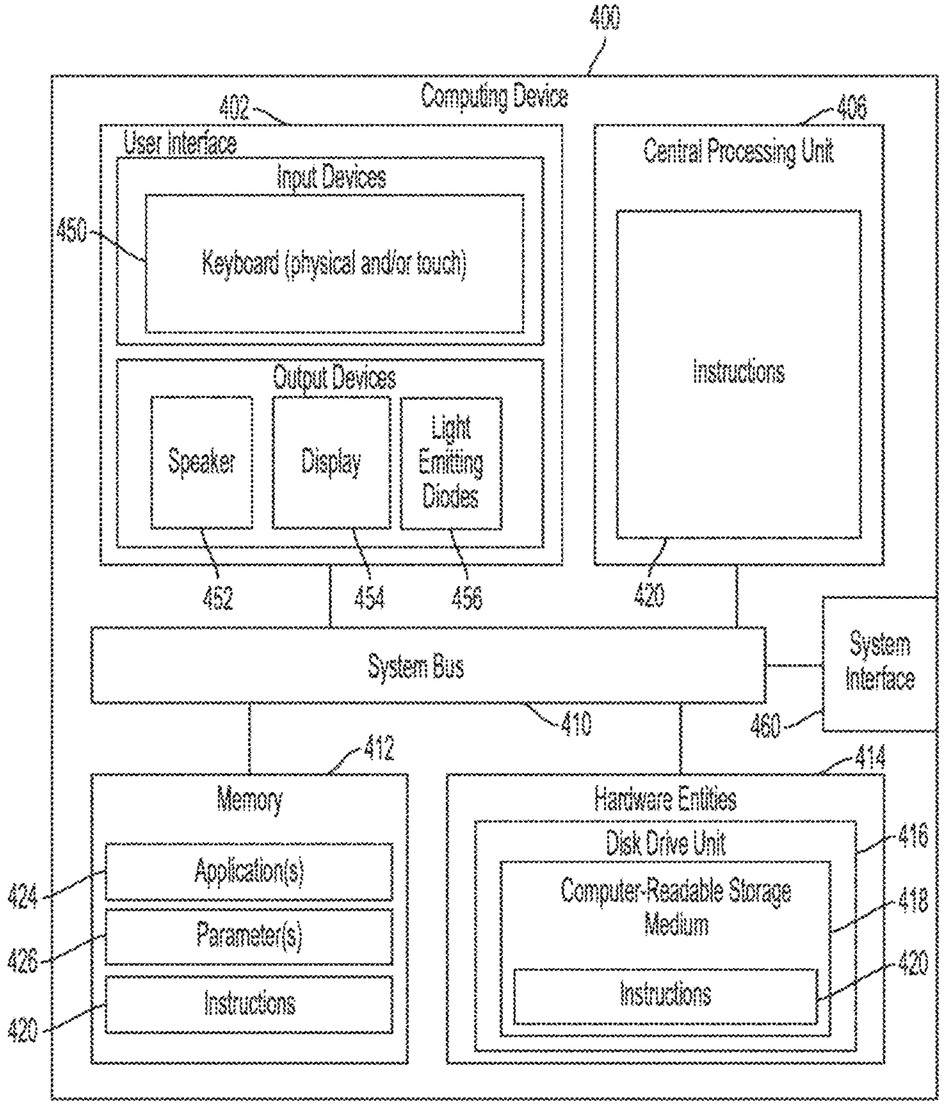
FIG. 4 is a diagram of a non-limiting embodiment of a computing device.

Referring now to FIG. 4, FIG. 4 is a diagram of an architecture for a computing device 400. Computing device 400 can correspond to sensor analysis system 102 (e.g., one or more devices of sensor analysis system 102), sensor system 104 (e.g., one or more devices of sensor system 104), and/or e-ink display device 106. In some non-limiting embodiments, one or more devices of (e.g., one or more devices of a system of) sensor analysis system 102, sensor system 104, and/or e-ink display device 106 (e.g., one or more devices of system architecture 200, etc.) can include at least one computing device 400 and/or at least one component of computing device 400. In some non-limiting embodiments, an autonomous vehicle can include at least one computing device 400 and/or at least one component of computing device 400.

The number and arrangement of components shown in FIG. 4 are provided as an example. In some non-limiting embodiments, computing device 400 may include additional components, fewer components, different components, or differently arranged components than those shown in FIG. 4. Additionally or alternatively, a set of components (e.g., one or more components) of computing device 400 may perform one or more functions described as being performed by another set of components of computing device 400.

As shown in FIG. 4, computing device 400 comprises user interface 402, Central Processing Unit (CPU) 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes, such as access points, etc.).

At least some of hardware entities 414 may perform actions involving access to and use of memory 412, which can be a random access memory (RAM), a disk drive, flash memory, a compact disc read only memory (CD-ROM) and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, application(s) 424, and/or parameter(s) 426 can also reside, completely or at least partially, within memory 412 and/or within CPU 406 during execution and/or use thereof by computing device 400. Memory 412 and CPU 406 may include machine-readable media (e.g., non-transitory computer-readable media). The term "machine-readable media", as used herein, may refer to a single medium or multiple media (e.g., a centralized or distributed database and/or associated caches and server) that store the one or more sets of instructions 420. The term "machine-readable media", as used herein, may refer to any medium that is capable of storing, encoding, or carrying a set of instructions 420 for execution by computing device 400 and that cause computing device 400 to perform any one or more of the methodologies of the present disclosure.

Figure 5:
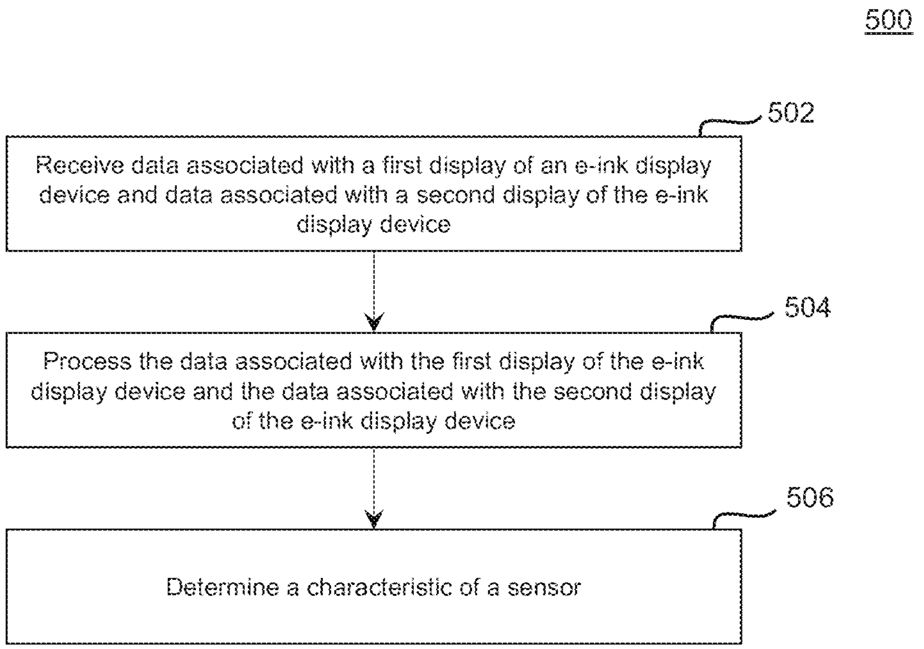
FIG. 5 is a flowchart of a non-limiting embodiment of a process for determining a characteristic of a sensor based on a display of an e-ink display device.

Referring now to FIG. 5, FIG. 5 is a flowchart of non-limiting embodiments of a process 500 for determining a characteristic of a sensor, such as a LiDAR sensor, based on a display of an e-ink display device. In some non-limiting embodiments, one or more of the steps of process 500 may be performed (e.g., completely, partially, etc.) with sensor analysis system 102 (e.g., one or more devices of sensor analysis system 102, etc.). In some non-limiting embodiments, one or more of the steps of process 500 may be performed (e.g., completely, partially, etc.) with another device or a group of devices separate from or including sensor analysis system 102, such as sensor system 104 and/or e-ink display device 106. In some non-limiting embodiments, one or more of the steps of process 500 may be performed with an autonomous vehicle (e.g., system architecture 200 of an autonomous vehicle, etc.).

As shown in FIG. 5, at step 502, process 500 includes receiving data associated with a first display of an e-ink display device and data associated with a second display of the e-ink display device. For example, sensor analysis system 102 may receive data associated with a first display of e-ink display device 106 and/or data associated with a second display of the e-ink display device 106. In some non-limiting embodiments, sensor analysis system 102 may receive the data associated with a display of e-ink display device 106 based on a sensor reading e-ink display device 106. For example, e-ink display device 106 may provide a display (e.g., information in the form of a pattern) on a screen of e-ink display device 106. Sensor system 104 may read the display on the screen of e-ink display device 106 and provide data associated with the display on the screen of e-ink display device 106 to sensor analysis system 102. Sensor analysis system 102 may receive the data associated with the display on the screen of e-ink display device 106 based on sensor system 104 providing (e.g., transmitting) the data associated with the display on the screen of e-ink display device 106.

In some non-limiting embodiments, a display of e-ink display device 106 may include one or more patterns that are displayed for enhancing a calibration of a sensor (e.g., a sensor of sensor system 104) and/or a characterization of data provided by the sensor. The data associated with the display of e-ink display device 106 may also include data for use in calibrating and commissioning a sensor device (e.g., preconfigured calibration patterns and the like).

In some non-limiting embodiments, a display (e.g., a first display, a second display, etc.) of e-ink display device 106 may include information that is provided (e.g., shown, displayed, output, projected, etc.) on a screen of e-ink display device 106. For example, the display of e-ink display device 106 may include a pattern of information (e.g., a pattern of shapes, a pattern of alternating colors, such as black and white colors, a pattern of shades of colors, etc.) that is to read by sensor system 104 (e.g., a sensor of sensor system 104).

In some non-limiting embodiments, a first display of e-ink display device 106 may be different from a second display of e-ink display device 106. For example, the first display of e-ink display device 106 may include a first pattern of information that is different from a second pattern of information included in the second display of e-ink display device 106. In some non-limiting embodiments, the first display of e-ink display device 106 and/or the second display of e-ink display device 106 may include a pattern of information that is designed to allow for testing of a characteristic of a sensor (e.g., a sensor of sensor system 104).

In some non-limiting embodiments, a characteristic of a sensor may include a characteristic associated with direction at which the sensor will detect an object (e.g., a pointing direction, a pointing angle, etc.), a characteristic associated with range accuracy of the sensor, a characteristic associated with a standard deviation of range measurements of the sensor, a characteristic associated with reflectivity accuracy of the sensor, and/or the like. In some non-limiting embodiments, the characteristic may include a characteristic of a LiDAR sensor of sensor system 104.

In some non-limiting embodiments, the data associated with the first display of e-ink display device 106 is based on a first reading of e-ink display device 106 by sensor system 104 and the data associated with the second display of e-ink display device 106 is based on a second reading of e-ink display device 106 by sensor system 104.

In some non-limiting embodiments, the first display of e-ink display device 106 may include a first pattern associated with a representation of a first object positioned at a first distance (e.g., a first distance from sensor system 104), and the second display of e-ink display device 106 comprises a second pattern associated with a representation of a second object positioned at a second distance from the sensor system. In some non-limiting embodiments, the first pattern associated with the representation of the first object positioned at the first distance from the sensor system may include a first pattern having a first value of reflectivity (e.g., reflectivity of e-ink display device 106) and the second pattern associated with the representation of the second object positioned at the second distance from the sensor system comprises a second pattern having a second value of reflectivity.

In some non-limiting embodiments, data associated with the display of e-ink display device 106 may include data associated with a reading (e.g., a measurement, a recording, a detected aspect, etc.) of the display of e-ink display device 106. For example, data associated with the display of e-ink display device 106 may include data that is generated by sensor system 104 (e.g., a sensor of sensor system 104) based on sensor system 104 sensing (e.g., reading, detecting, measuring, etc.) the display of e-ink display device 106.

In some non-limiting embodiments, the data associated with the display of e-ink display device 106 may include data associated with a representation of an object (e.g., a target object of a sensor, an object that may occur in an environment of an autonomous vehicle, such as a person, a traffic sign, a vehicle, etc.) that is provided on a screen of e-ink display device 106. For example, the data associated with the display of e-ink display device 106 may include data associated with physical property (e.g., a value of reflectivity, a position, a distance, a shape, a height, a width, a color, a velocity, a rate of acceleration, a direction of movement, etc.) of the representation of the object as detected by sensor system 104. In some non-limiting embodiments, sensor analysis system 102 may generate the data associated with the display of e-ink display device 106 based on data received from sensor system 104. For example, sensor analysis system 102 may receive an output signal from a sensor of sensor system 104, and sensor analysis system 102 may generate the data associated with the display of e-ink display device 106 based on the output signal.

In some non-limiting embodiments, sensor analysis system 102 may store the data associated with the display of e-ink display device 106. For example, sensor analysis system 102 may store the data associated with the display of e-ink display device 106 in a data structure (e.g., a database, a linked list, a tree, and/or the like). The data structure may be located within sensor analysis system 102 or external to (e.g., remote from) sensor analysis system 102.

In some non-limiting embodiments, sensor analysis system 102 may control another device. For example, sensor analysis system 102 may control e-ink display device 106 to provide a first display of e-ink display device 106 and control e-ink display device 106 to provide a second display of e-ink display device 106. In some non-limiting embodiments, sensor analysis system 102 may control sensor system 104 to read (e.g., to obtain a reading of) the first display and/or the second display of e-ink display device 106. According to some aspects, the first display and the second display of e-ink display device 106 may be displayed simultaneously at different portions of e-ink display device 106. Alternatively, it can be appreciated that the first display and the second display of e-ink display device 106 may be displayed sequentially based on a characterization function and/or calibration function being initiated by sensor analysis system 102.

As shown in FIG. 5, at step 504, process 500 includes processing the data associated with the first display of the e-ink display device and the data associated with the second display of the e-ink display device. For example, sensor analysis system 102 may process data associated with the first display of e-ink display device 106 and data associated with the second display of e-ink display device 106 to provide a quantitative result. In some non-limiting embodiments, sensor analysis system 102 may compare the data associated with the first display of e-ink display device 106 and the data associated with the second display of e-ink display device 106 to determine a characteristic of sensor system 104 (e.g., a sensor of sensor system 104). For example, sensor analysis system 102 may receive the data associated with the first display of e-ink display device 106 based on a first reading of a screen of e-ink display device 106 by sensor system 104, and sensor analysis system 102 may receive the data associated with the second display of e-ink display device 106 based on a second reading of the screen of e-ink display device 106 by sensor system 104. In such an example, sensor analysis system 102 may compare the data associated with the first display of e-ink display device 106 and the data associated with the second display of e-ink display device 106 based on receiving the data associated with the displays of e-ink display device 106. In this way, sensor analysis system 102 may use a comparison of the data associated with the first display of e-ink display device 106 and the data associated with the second display of e-ink display device 106 to determine the characteristic of a sensor of sensor system 104 involved in reading the screen of e-ink display device 106.

In some non-limiting embodiments, sensor analysis system 102 may compare the data associated with the first display of e-ink display device 106 and the data associated with the second display of e-ink display device 106 and determine a quantitative result, where the a quantitative result is a metric (e.g., a metric used in calibrating a sensor). In some non-limiting embodiments, the metric may be a metric associated with a difference between the data associated with the first display of e-ink display device 106 and the data associated with the second display of e-ink display device 106. For example, the metric may be a metric associated with an error value (e.g., an error value based on a parameter measured by the sensor, such as reflectivity). In some non-limiting embodiments, a characteristic of sensor system 104 is based on the metric. For example, the characteristic of sensor system 104 may be determined using the metric.

As shown in FIG. 5, at step 506, process 500 includes determining a characteristic of a sensor. For example, sensor analysis system 102 may determine a characteristic of a sensor of sensor system 104. In some non-limiting embodiments, sensor analysis system 102 may determine the characteristic of the sensor based on processing data associated with the first display of e-ink display device 106 and data associated with the second display of e-ink display device 106. In some non-limiting embodiments, the characteristic of the sensor may be directly related to a display (e.g., pattern) provided by e-ink display device 106 and/or a condition, such as an intensity level, at which the display is provided. In some non-limiting embodiments, sensor analysis system 102 may select a display (e.g., of a plurality of displays) to be provided by e-ink display device 106 and/or a condition (e.g., of a plurality of conditions) at which the display is provided, based on the characteristic of the sensor of sensor system 104.

In some non-limiting embodiments, sensor analysis system 102 may determine the characteristic of the sensor by determining whether a result (e.g., a quantitative result that includes a metric, such as a metric associated with an error value of sensor system 104, a quantitative result that includes a plot of values of distance and/or reflectivity versus an error value of sensor system 104, etc.) of comparing data associated with a first display of e-ink display device 106 and data associated with a second display of e-ink display device 106 satisfies a threshold (e.g., a threshold value of accuracy). In some non-limiting embodiments, if sensor analysis system 102 determines that the result of comparing the data associated with the first display of e-ink display device 106 and the data associated with the second display of e-ink display device 106 satisfies the threshold, sensor analysis system 102 may determine the characteristic of the sensor. In some non-limiting embodiments, if sensor analysis system 102 determines that the result of comparing the data associated with the first display of e-ink display device 106 and the data associated with the second display of e-ink display device 106 does not satisfy the threshold, sensor analysis system 102 may forego determining the characteristic of the sensor.

In some non-limiting embodiments, sensor analysis system 102 may perform an action based on a characteristic of a sensor. For example, sensor analysis system 102 may adjust a threshold (e.g., a threshold value of acceptable risk behavior) associated with a perception component (e.g., a component of a perception stack) of an autonomous vehicle.

In some non-limiting embodiments, sensor analysis system 102 may determine a calibration setting associated with sensor system 104 based on the characteristic. For example, sensor analysis system 102 may determine an extrinsic calibration setting associated with a sensor of sensor system 104 (e.g., a calibration setting associated external aspects of a sensor, such as directions at which a sensor is pointed) and/or an intrinsic calibration setting associated with a sensor of sensor system 104 (e.g., a calibration setting associated with internal aspects of a sensor, such as directions at which a beam of light is pointed) based on the characteristic.

In some non-limiting embodiments, sensor analysis system 102 may determine a calibration setting associated with a perception component (e.g., a perception component of an autonomous vehicle, a perception component of a robotic device, etc.) and adjust the calibration setting associated with the perception component. In some non-limiting embodiments, sensor analysis system 102 may provide an indication that the sensor is to be replaced and/or adjusted. In another example, sensor analysis system 102 may adjust a position (e.g., an orientation, such as a direction from which a reading is to be taken, etc.) of the sensor.

In some non-limiting embodiments, sensor analysis system 102 may perform an action with an autonomous vehicle. In some non-limiting embodiments, sensor analysis system 102 may control an operation of the autonomous vehicle in a real-time environment. For example, sensor analysis system 102 may control an operation of the autonomous vehicle in a real-time environment based on a characteristic of a sensor (e.g., a characteristic of a sensor determined by sensor analysis system 102). In some non-limiting embodiments, sensor analysis system 102 may transmit a control signal to the autonomous vehicle to control an operational characteristic (e.g., velocity, acceleration, deceleration, etc.) of the autonomous vehicle.

Figure 6:
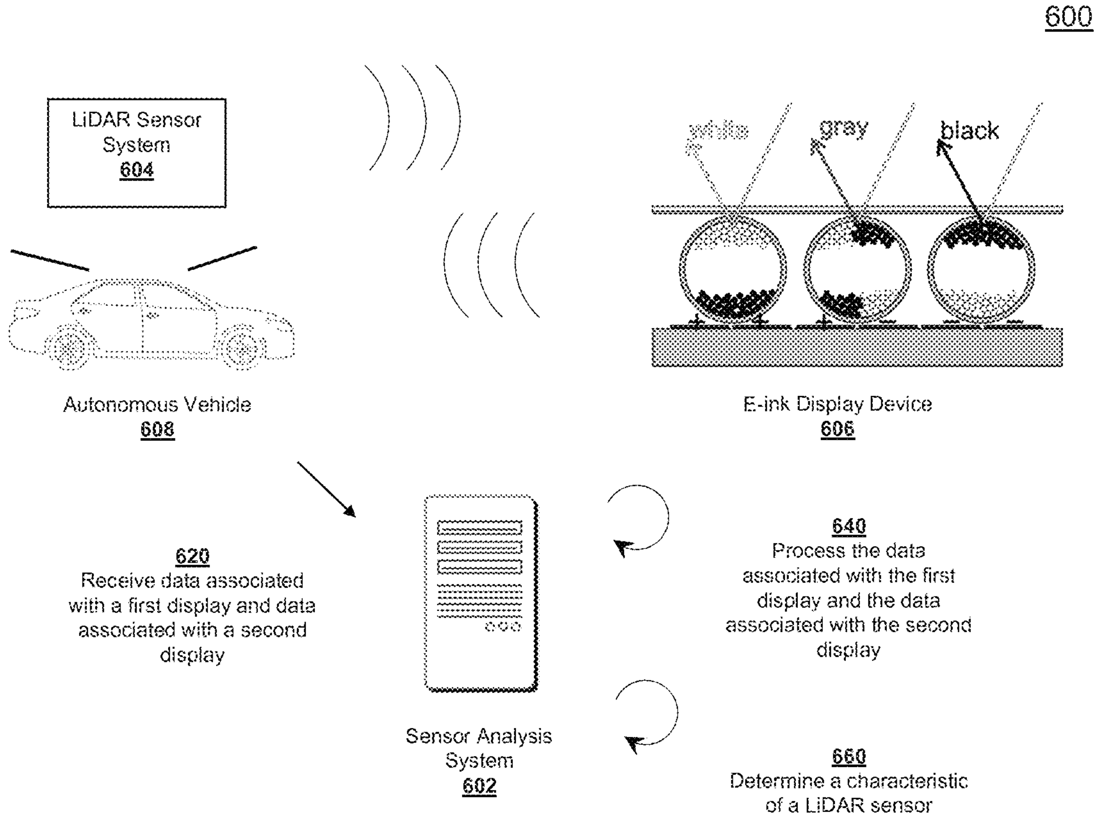
FIG. 6 is a diagram of a non-limiting embodiment of an implementation of a process for determining a characteristic of a sensor based on a display of an e-ink display device.

Referring now to FIG. 6, FIG. 6 is a diagram of a non-limiting embodiment of an implementation of process 600 (e.g., process 500) for determining a characteristic of a sensor. As shown in FIG. 6, process 600 may include sensor analysis system 602, LiDAR sensor system 604, e-ink display device 606, and autonomous vehicle 608. In some non-limiting embodiments, sensor analysis system 602 may the same as or similar to sensor analysis system 102. In some non-limiting embodiments, LiDAR sensor system 604 may be the same as or similar to sensor system 104. In some non-limiting embodiments, e-ink display device 606 may be the same as or similar to e-ink display device 106. In some non-limiting embodiments, autonomous vehicle 608 may be the same as or similar to an autonomous vehicle as described herein.

As shown by reference number 620 in FIG. 6, sensor analysis system 602 may receive data associated with a first display of e-ink display device 606 and data associated with a second display of e-ink display device 606. In some non-limiting embodiments, the data associated with the first display and/or the second display of e-ink display device 606 may include data associated with a representation of an object (e.g., a target object of a sensor, an object that may occur in an environment of an autonomous vehicle, such as a person, a traffic sign, a vehicle, etc.) that is provided on a screen of e-ink display device 606.

In some non-limiting embodiments, the first display of e-ink display device 606 may include a first pattern associated with a representation of a first object positioned at a first distance from LiDAR sensor system 604, and the second display of e-ink display device 606 comprises a second pattern associated with a representation of a second object positioned at a second distance from LiDAR sensor system 604. In some non-limiting embodiments, the first pattern has a first value of reflectivity and the second pattern has a second value of reflectivity.

In some non-limiting embodiments, sensor analysis system 602 may receive and/or generate the data associated with the first and second displays of e-ink display device 606 based on data received from LiDAR sensor system 604. For example, for each of the first and second displays of e-ink display device 606, LiDAR sensor system 604 (e.g., a LiDAR sensor of LiDAR sensor system 604) may emit a light pulse and receive light (e.g., an amount of light, one or more wavelengths of light, a pattern of light, etc.) reflected by e-ink display device 606 (e.g., reflected based on the first display of e-ink display device 606, reflected based on the second display of e-ink display device 606, etc.). LiDAR sensor system 604 may generate an output signal based on the light reflected by e-ink display device 606. Sensor analysis system 602 may receive the output signal from LiDAR sensor system 604, and sensor analysis system 602 may generate the data associated with a respective display of e-ink display device 606 based on the output signal.

As further shown by reference number 640 in FIG. 6, sensor analysis system 602 may process the data associated with the first display of e-ink display device 606 and the data associated with the second display of e-ink display device 606. For example, sensor analysis system 602 may compare the data associated with the first display of e-ink display device 606 and the data associated with the second display of e-ink display device 606 and determine a quantitative result, where the a quantitative result is a metric (e.g., a metric used in calibrating a sensor). In some non-limiting embodiments, the metric may be a metric associated with a difference between the data associated with the first display of e-ink display device 606 and the data associated with the second display of e-ink display device 606. For example, the metric may be a metric associated with an error value (e.g., an error value based on a parameter measured by LiDAR sensor system 604, such as reflectivity). In some non-limiting embodiments, a characteristic of LiDAR sensor system 604 is based on the metric. For example, the characteristic of LiDAR sensor system 604 may be determined using the metric.

As further shown by reference number 660 in FIG. 6, sensor analysis system 602 may determine a characteristic of a LiDAR sensor of LiDAR sensor system 604. In some non-limiting embodiments, sensor analysis system 602 may determine the characteristic of the LiDAR sensor based on processing data associated with the first display of e-ink display device 606 and data associated with the second display of e-ink display device 606. In some non-limiting embodiments, the characteristic may include a characteristic associated with direction at which the sensor will detect an object (e.g., a pointing direction, a pointing angle, etc.), a characteristic associated with range accuracy of the sensor, a characteristic associated with a standard deviation of range measurements of the sensor, a characteristic associated with reflectivity accuracy of the sensor, and/or the like.

Figure 7A:
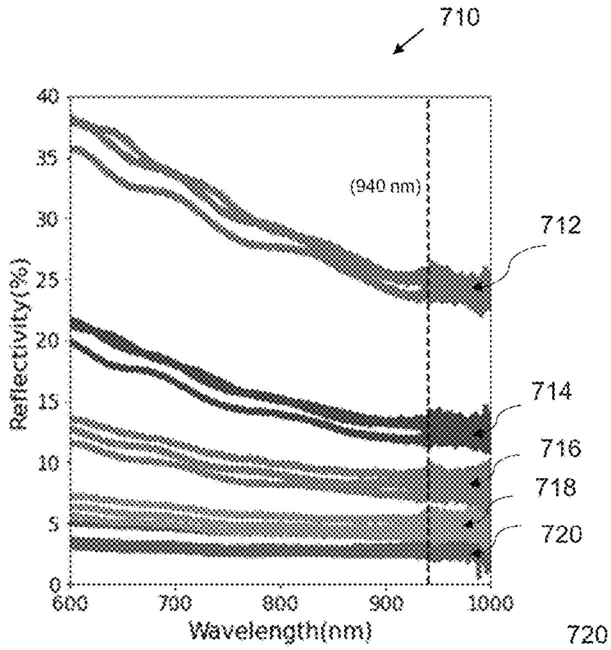
FIGS. 7A-7B are graphs showing a relationship between reflectivity of an e-ink display device and wavelength of light, and reflectivity of the e-ink display and refractive index with regard to angle of incidence.
Figure 7B:
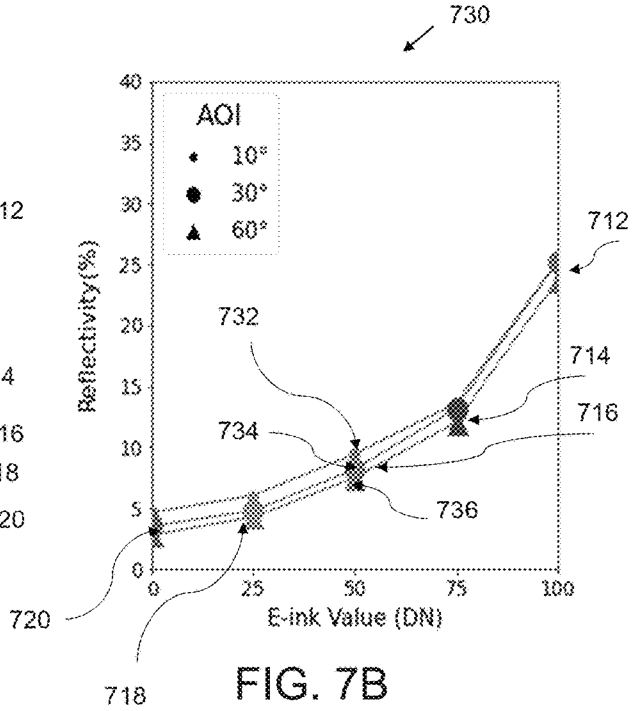

Referring now to FIGS. 7A-7B, FIG. 7A is a graph 710 showing a relationship between reflectivity of an e-ink display device (e.g., e-ink display device 106, e-ink display device 606, etc.) and wavelength of light, with regard to varying e-ink values, and FIG. 7B is a graph 730 showing a relationship between reflectivity of the e-ink display device and angle of incidence at a wavelength of light of 940 nm, with regard to the varying e-ink values.

As shown in FIGS. 7A-7B, line 712 has an e-ink value (e.g., an e-ink value provided as a digital number (DN)) of 100, line 714 has an e-ink value of 75, line 716 has an e-ink value of 50, line 718 has an e-ink value of 25, and line 720 has an e-ink value of 0. As can be seen in FIG. 7A, a value of reflectivity (e.g., as a percentage of light reflected by an e-ink display device) generally decreases for each of lines 712, 714, 716, 718, 720 as wavelength increases. As further shown in FIG. 7B, for each of the e-ink values represented by lines 712, 714, 716, 718, 720, and at a wavelength of 940 nm, line 732 represents an angle of incidence (AOI) of 10 degrees, line 734 represents an AOI of 30 degrees, and line 736 represents an AOI of 60 degrees. As can be seen in FIG. 7B, a value of reflectivity (e.g., as a percentage of light reflected by an e-ink display device) generally increases as the e-ink value increases for each AOI (e.g., 10 degrees, 30 degrees, and 60 degrees) at 940 nm.

Although embodiments have been described in detail for the purpose of illustration and description, it is to be understood that such detail is solely for that purpose and that embodiments are not limited to the disclosed embodiments, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system, the system comprising:

a memory; and at least one processor coupled to the memory and configured to:

receive data associated with a first display having a first pattern of an e-ink display device and data associated with a second display having a second pattern of the e-ink display device, wherein the data associated with the first display of the e-ink display device is based on a first reading of the e-ink display device by a sensor system and the data associated with the second display of the e-ink display device is based on a second reading of the e-ink display device by the sensor system;

process the data associated with the first display of the e-ink display device and the data associated with the second display of the e-ink display device to provide a quantitative result; and determine a characteristic of the sensor system based on the quantitative result, wherein the first pattern is different than the second pattern, wherein the first pattern has a first e-ink value in the first display of the e-ink display device, and the second pattern has a second e-ink value different from the first e-ink value in the first display of the e-ink display device, and wherein the at least one processor is configured to provide the quantitative result based on a difference between the data associated with the first display of the e-ink display device and the data associated with the second display of the e-ink display device.

2. The system of claim 1, wherein the sensor system comprises a light detection and ranging (LiDAR) sensor.

3. The system of claim 1, wherein, when processing the data associated with the first display of the e-ink display device and the data associated with the second display of the e-ink display device to provide the quantitative result, the at least one processor is configured to:

compare the data associated with the first display of the e-ink display device and the data associated with the second display of the e-ink display device; and determine a metric associated with a difference between the data associated with the first display of the e-ink display device and the data associated with the second display of the e-ink display device, wherein the characteristic of the sensor system is based on the metric.

4. The system of claim 1, wherein the at least one processor is further configured to:

control the e-ink display device to provide the first display of the e-ink display device; and control the e-ink display device to provide the second display of the e-ink display device.

5. The system of claim 4, wherein the first display of the e-ink display device comprises a first pattern associated with a representation of a first object positioned at a first distance from the sensor system; and wherein the second display of the e-ink display device comprises a second pattern associated with a representation of a second object positioned at a second distance from the sensor system.

6. The system of claim 5, wherein the first pattern associated with the representation of the first object positioned at the first distance from the sensor system has a first value of reflectivity; and wherein the second pattern associated with the representation of the second object positioned at the second distance from the sensor system has a second value of reflectivity.

7. The system of claim 1, wherein the at least one processor is further configured to compare the quantitative result to a threshold and determine the characteristic of the sensor if the quantitative result satisfies the threshold.

8. A computer program product comprising at least one non-transitory computer-readable medium comprising one or more instructions that, when executed by at least one processor, cause the at least one processor to:

receive data associated with a first display having a first pattern of an e-ink display device and data associated with a second display having a second pattern of the e-ink display device, wherein the data associated with the first display of the e-ink display device is based on a first reading of the e-ink display device by a sensor system and the data associated with the second display of the e-ink display device is based on a second reading of the e-ink display device by the sensor system;

process the data associated with the first display of the e-ink display device and the data associated with the second display of the e-ink display device to provide a quantitative result; and determine a characteristic of the sensor system based on the quantitative result, wherein the first pattern is different than the second pattern, wherein the first pattern has a first e-ink value in the first display of the e-ink display device, and the second pattern has a second e-ink value different from the first e-ink value in the first display of the e-ink display device, and wherein the at least one processor is configured to provide the quantitative result based on a difference between the data associated with the first display of the e-ink display device and the data associated with the second display of the e-ink display device.

9. The computer program product of claim 8, wherein the sensor system comprises a light detection and ranging (LiDAR) sensor.

10. The computer program product of claim 8, wherein, the one or more instructions that cause the at least one processor to process the data associated with the first display of the e-ink display device and the data associated with the second display of the e-ink display device to provide the quantitative result, cause the at least one processor to:

compare the data associated with the first display of the e-ink display device and the data associated with the second display of the e-ink display device; and determine a metric associated with a difference between the data associated with the first display of the e-ink display device and the data associated with the second display of the e-ink display device; and wherein the characteristic of the sensor system is based on the metric.

11. The computer program product of claim 8, wherein the one or more instructions further cause the at least one processor to:

control the e-ink display device to provide the first display of the e-ink display device; and control the e-ink display device to provide the second display of the e-ink display device.

12. The computer program product of claim 11, wherein the first display of the e-ink display device comprises a first pattern associated with a representation of a first object positioned at a first distance from the sensor system; and wherein the second display of the e-ink display device comprises a second pattern associated with a representation of a second object positioned at a second distance from the sensor system.

13. The computer program product of claim 12, wherein the first pattern associated with the representation of the first object positioned at the first distance from the sensor system has a first value of reflectivity; and wherein the second pattern associated with the representation of the second object positioned at the second distance from the sensor system has a second value of reflectivity.

14. The computer program product of claim 13, wherein the one or more instructions further cause the at least one processor to:

determine a calibration setting associated with a perception component of an autonomous vehicle; and adjust the calibration setting associated with the perception component of the autonomous vehicle.

15. A computer-implemented method, the method comprising:

receiving, with at least one processor, data associated with a first display having a first pattern of an e-ink display device and data associated with a second display having a second pattern of the e-ink display device, wherein the data associated with the first display of the e-ink display device is based on a first reading of the e-ink display device by a sensor system and the data associated with the second display of the e-ink display device is based on a second reading of the e-ink display device by the sensor system;

processing, with at least one processor, the data associated with the first display of the e-ink display device and the data associated with the second display of the e-ink display device to provide a quantitative result; and determining, with at least one processor, a characteristic of the sensor system based on the quantitative result, wherein the first pattern is different than the second pattern, wherein the first pattern has a first e-ink value in the first display of the e-ink display device, and the second pattern has a second e-ink value different from the first e-ink value in the first display of the e-ink display device, and wherein the at least one processor is configured to provide the quantitative result based on a difference between the data associated with the first display of the e-ink display device and the data associated with the second display of the e-ink display device.

16. The computer-implemented method of claim 15, wherein processing the data associated with the first display of the e-ink display device and the data associated with the second display of the e-ink display device to provide the quantitative result comprises:

comparing the data associated with the first display of the e-ink display device and the data associated with the second display of the e-ink display device; and determining a metric associated with a difference between the data associated with the first display of the e-ink display device and the data associated with the second display of the e-ink display device; and wherein the characteristic of the sensor system is based on the metric.

17. The computer-implemented method of claim 15, further comprising:

controlling the e-ink display device to provide the first display of the e-ink display device; and controlling the e-ink display device to provide the second display of the e-ink display device.

18. The computer-implemented method of claim 17, wherein the first display of the e-ink display device comprises a first pattern associated with a representation of a first object positioned at a first distance from the sensor system; and wherein the second display of the e-ink display device comprises a second pattern associated with a representation of a second object positioned at a second distance from the sensor system.

19. The computer-implemented method of claim 18, wherein the first pattern associated with the representation of the first object positioned at the first distance from the sensor system has a first value of reflectivity; and wherein the second pattern associated with the representation of the second object positioned at the second distance from the sensor system has a second value of reflectivity.

20. The computer-implemented method of claim 15, further comprising:

determining a calibration setting associated with a perception component of an autonomous vehicle; and adjusting the calibration setting associated with the perception component of the autonomous vehicle.

* * * * *